United States Patent [19]

Steingrover

[11] 4,177,890
[45] Dec. 11, 1979

[54] DEVICE FOR THE FORMATION OF SEPARATED ROWS OF GREEN BRICKS

[75] Inventor: Horst Steingrover, Ibbenbueren, Fed. Rep. of Germany

[73] Assignee: C. Keller GmbH u. Co. KG, Fed. Rep. of Germany

[21] Appl. No.: 898,244

[22] Filed: Apr. 20, 1978

[30] Foreign Application Priority Data

Jul. 6, 1977 [DE] Fed. Rep. of Germany ....... 2730428

[51] Int. Cl.² ............................................ B65G 47/30
[52] U.S. Cl. .................................... 198/434; 198/458
[58] Field of Search ............... 214/6 A; 198/425, 434, 198/456, 458

[56] References Cited

U.S. PATENT DOCUMENTS

| 3,887,060 | 6/1975 | Kamphues | 214/6 A |
| 4,029,198 | 6/1977 | Lingl, Jr. | 198/425 |

*Primary Examiner*—Jeffrey V. Nase
*Attorney, Agent, or Firm*—Frank J. Jordan

[57] ABSTRACT

For separating green bricks arranged in a compact array of abutting rows, a separating device is operable to engage the leading row of the compact array and to hold the individual row between the separating device and a base as the remainder of the array is moved away, whereby the engaged individual rows are sequentially separated at spaced distances on the base.

3 Claims, 2 Drawing Figures

DEVICE FOR THE FORMATION OF SEPARATED ROWS OF GREEN BRICKS

BACKGROUND OF THE INVENTION

This invention relates to a device for forming separated rows of green bricks, particularly rigidly pressed green bricks, wherein there is a base accepting a compact layer of abutting crossrows of green bricks, and a device for separating the crossrows of the green bricks so that they form separate rows spaced from one another at predetermined distances. Such a device is disclosed, for example in German DT-PS No. 2,312,946 or DT-PS No. 1,281,637. The devices should be capable of transferring to firing carriages and arranging into firing arrays suitable for firing not only dried green bricks but also dry-pressed green bricks which still contain some moisture. Such devices should be capable to transforming compact and abutting rows into interrupted or separated rows with distances between the crossrows. These known devices, however, are not capable of forming distance-rows or separated rows out of campact or abutting rows because the moisture contained in the green bricks causes the green bricks, which abut one another in the compact rows, to stick together and thereby prevent attempts to separate them.

An objective of the present invention is to provide a device for the formation of an interrupted or separated rows of green bricks so that it is possible to interrupt or separate rows consisting of rigidly pressed green bricks which still contain some moisture.

This objective is achieved according to the invention by positioning above the compact row a separating means, having a separating member extending over the whole width of the row and which may be lifted and lowered and which holds the green bricks in the individual crossrows.

In a further embodiment of the invention, the separating member is mounted on a carriage and the carriage is movably disposed upon a track which is positioned above the rows of bricks, the track guiding the carriage as the latter moves to and fro according to the process of separating the green bricks.

The achievement according to the invention now permits the formation of separated rows of rigidly pressed green bricks, because the green bricks are now held in their individual crossrows and are separated from the consecutive crossrows.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
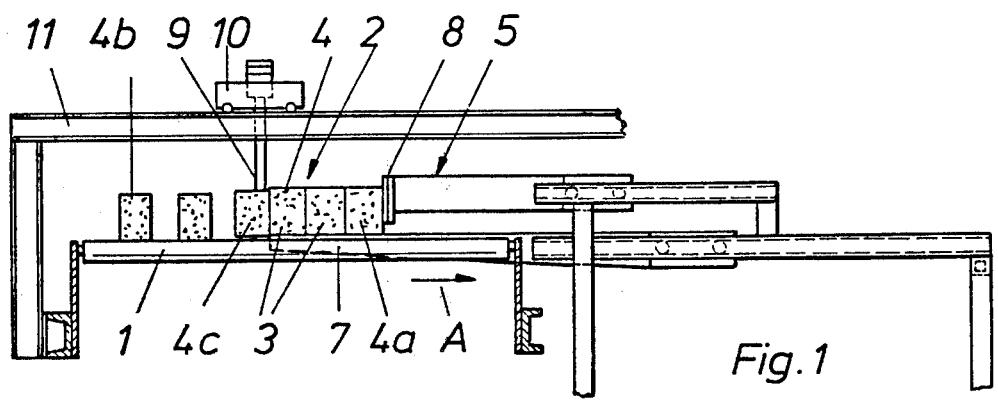
FIG. 1 is a side elevation of the device during the formation of a separate row.
Figure 2:
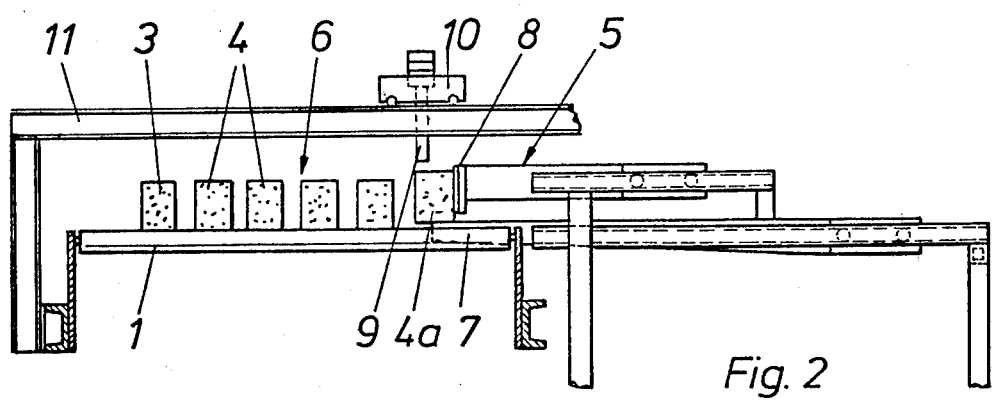
FIG. 2 is a side elevation of the device shown in FIG. 1, but during another phase of its operation.

Referring to the drawings, there is shown a base 1 which accepts a compact array or layer of green bricks 3 arranged in abutting crossrows 4.

An operating device 5 serves to separate the crossrows 4 in the compact and abutting layer 2 so that the crossrows 4 are disposed at predetermined distances from one another to form a distance-layer 6 of green bricks. This separation of the crossrows 4 is achieved in the illustrated embodiment by lifting the compact layer 2 slightly from the base 1 by the use of a lifter means comprising a lifter member 7 and by moving the lifting member 7 and the layer 2 thereon in the direction of the arrow A (FIG. 1) until the end crossrow 4, which is the very first crossrow in the direction of movement of the lifter 7, meets a counterforce exerted by a stop 8, whereupon the stop 8 pushes the very last crossrow 4b again onto the base 1 as the lifter continues to move in the direction of the arrow A. The remainder of the crossrows 4 on the lifter 7 are moved in the direction of arrow A while the resistance or the action of the stop 8 is terminated, that is, the stop 8 moves in the direction of arrow A simultaneously with the lifter 7, until a desired separating distance between the crossrows on the base 1 is obtained. Thereafter, the renewed action of the resistance, retraction of the stop 8, is set correspondingly, that is the movement of the stop 8 is halted, thereby causing another crossrow 4 to be pushed from the lifter 7 onto the base 1. This repeated procedure causes the creation of the distance-layers 6 with their predetermined distances between the crossrows 4 after such a stepwise repeated pushing of the successive crossrows 4 from the lifter 7 onto the base 1.

Such a formation of distance-layers of dried green bricks is possible without any difficulties because they do not adhere to each other. Difficulties arise, however, when using rigid pressed green bricks which have a moisture-content of 12 to 13% (calculated on their dry weight) because the green bricks 3 in the crossrows 4 stick together due to the moisture present and resist separating. In such a case, in order to prepare also correct distance-layers 6, a separating means comprising a separating member 9 is arranged above the base 1 and above the layers of bricks. The separating member is mounted on a carriage 10 which is movable along a track 11 and which is movable to and fro in accordance to the separating action for the formation of the distance-layers 6. Also the separating member 9 is movably mounted on the carriage 10 to be raised and lowered.

As set forth hereinbefore, the abutting crossrows 4 are moved in the direction of arrow A, for example until the row 4c is to be separated, whereupon the separating member 9 is lowered (for example to the position shown in FIG. 1) such that the separating member 9 engages the top of the crossrow 4c to hold the latter to the base 1 as the remainder of the abutting array of crossrows is moved in the direction of the arrow A by the lifting means 7. Each crossrow 4 is held by the separating member 9 on the base 1, after being set at its distance from the other crossrows. That happens because the separating member 9 presses from above upon the green bricks 3, while the not yet distanced and still abutting crossrows 4 are transported in the direction of the arrow A and are thereby separated from the held crossrow.

It is thought that the invention and many of its attendant advantages will be understood from the foregoing description and that it will be apparent that various changes may be made in the form, construction, and arrangement of the parts without departing from the spirit and scope of the invention or sacrificing all of its material advantages. The form heretofore described being merely a preferred embodiment thereof.

What is claimed is:

1. Apparatus for separating green bricks of the type which tend to stick together when abutting one another, said green bricks being arranged in a compact array of abutting crossrows, comprising a base receiving the separated green bricks, a lifting means operable to hold the compact array above said base and to be moved laterally relative to said base as leading crossrows are sequentially deposited from the lifting means onto the base, and separating means disposed over said base, said separating means comprising a separating member movable upwardly and downwardly, said separating member being movable downwardly toward the compact array of green bricks to engage the leading crossrow to thereby hold the engaged leading crossrow on said base as the remainder of the compact array of abutting crossrows moves laterally away from the held leading crossrow, thereby separating the held individual row from the remainder of the green bricks in the compact array.

2. Apparatus according to claim 1 wherein said separating means comprises a track disposed above said base and a carriage movable along said track in said lateral direction, said carriage mounting said separating member for said up and down movement.

3. Apparatus for separating green bricks of the type which tend to stick together when abutting one another, said green bricks being arranged in a compact array of abutting crossrows, comprising a base receiving the separated green bricks, a lifting means operable to hold the compact array above said base and to be moved laterally relative to said base as leading crossrows are sequentially deposited from the lifting means onto the base, and separating means disposed over said base, said separating means comprising a carriage and means mounting said carriage for movement in said lateral direction, said separating means further comprising a separating member movable upwardly and downwardly, said separating member being movable downwardly toward the compact array of green bricks to engage the leading crossrow to thereby hold the engaged leading crossrow on said base as the remainder of the compact array of abutting crossrows moves laterally away from the held leading crossrow, said carriage being subsequently movable in said lateral direction to position said separating member in a position overlying the next leading row such that said separating member engages and holds the last said leading row, whereby the held leading rows are sequentially separated from the remainder of the green bricks in the compact array.

* * * * *